United States Patent Office 3,109,825
Patented Nov. 5, 1963

3,109,825
MANUFACTURE OF POLYURETHANE MATERIALS
Derrick Michael O'Mant, Harry James Twitchett, and James Harry Wild, all of Manchester, England, assignors to Imperial Chemical Industries Limited, London, England, a corporation of Great Britain
No Drawing. Filed Feb. 11, 1960, Ser. No. 7,977
Claims priority, application Great Britain Feb. 27, 1959
10 Claims. (Cl. 260—2.5)

This invention relates to improvements in or relating to the manufacture of polymeric materials, more particularly foamed polymeric materials from hydroxyl-ended polymers and organic polyisocyanates.

It has already been proposed to prepare polymeric materials by the interaction of organic polyisocyanates with hydroxyl-containing materials for example polyesters, polyesteramides and polyethers, and to modify the reaction for example by the addition of water in order to produce blown, cellular polyurethane materials.

In manufacturing foamed polyurethane materials in this way, one available method consists of reacting the hydroxyl-containing material in a single-stage process with the organic polyisocyanate and water, if necessary in the presence of catalysts, surface active agents or other auxiliary agents, whereby simultaneous interaction between the isocyanate, water and hydroxyl-containing material occur to give a foamed product. Alternatively, the hydroxyl-containing material may be reacted with sufficient polyisocyanate to give an intermediate reaction product containing isocyanate groups, and this product may then be reacted with water, if desired in the presence of catalysts, surface active agents or other auxiliary agents, in order to produce the final foamed product.

Although the single-stage process is more desirable on both technical and economic grounds, it has hitherto been found that the production of satisfactory foamed products by this method is difficult or impossible in some instances, particularly when the hydroxyl-containing materials used are polyethers, for example polypropylene glycol. These difficulties appear to result, at least in part, from the lower reactivity towards polyisocyanates of secondary hydroxyl end groups present in such polyethers, in contrast to the higher reactivity of the primary hydroxyl end-groups commonly present in the polyesters used in making flexible foams. The addition to the reaction mixture of tertiary amines, for example dimethylcyclohexylamine and dimethylbenzylamine, which are widely employed in the art as catalysts in the manufacture of foamed polyurethane products, fails to accelerate the reaction of the polyethers containing many secondary hydroxyl end groups to an extent sufficient to make possible the production of satisfactory foams.

We have now found that it is possible to carry out this simultaneous interaction of hydroxyl-ended polymer, polyisocyanate and water very readily, and to produce a satisfactory foam when there is present as catalyst a substituted 4-aminopyridine. The new catalysts are remarkably effective and by their use foams of excellent physical properties are conveniently and economically made. Similar results cannot be secured by the use, even in large amounts, of the tertiary amines such as dimethyl cyclohexylamine and dimethylbenzylamine, which are commonly used as catalysts in the prior art processes.

Thus according to our invention we provide an improved process for the manufacture of polyurethane materials by the interaction of an organic polyisocyanate and a hydroxyl-containing material, characterised in that the interaction is carried out in the presence of a fully N-substituted 4-aminopyridine as catalyst.

Thus N-substituents may be substituted or unsubstituted radicals which may be hydrocarbon radicals or radicals containing one hetero-atom in a carbon chain; the nitrogen of the 4-aminopyridine may form a ring in conjunction with a difunctional substituent radical.

The N-substituents may be for example alkyl groups, in particular lower alkyl groups, for example methyl, ethyl, propyl and butyl, cycloalkyl groups, for example cyclopentyl and cyclohexyl, aralkyl groups, for example benzyl and phenyl ethyl, unsaturated aliphatic radicals, for example allyl and pentenyl and difunctional radicals which may be alkylene radicals for example tetramethylene and pentamethylene, or difunctional radicals which comprise fully saturated chains having as members at least four carbon atoms together with one hetero-atom such as an oxygen or nitrogen atom, for example the difunctional radicals that make, in conjunction with the nitrogen atom of the 4-aminopyridine, morpholine and piperazine rings.

The N-substituents may themselves carry substituting radicals, for example alkyl and dialkylamino groups, wherein the alkyl groups may be for example, methyl, ethyl, propyl and butyl groups.

Thus as examples of fully N-substituted 4-aminopyridines which may be used in the process of our invention there may be mentioned N:N-dimethyl-4-aminopyridine,
N:N-diethyl-4-aminopyridine,
N-ethyl-N-methyl-4-aminopyridine,
N-allyl-N-methyl-4-aminopyridine,
N-pentenyl-N-methyl-4-aminopyridine,
N-allyl-N-cyclohexyl-4-aminopyridine,
N:N-di-n-hexyl-4-aminopyridine,
N:N-dicyclohexyl-4-aminopyridine,
4-(N-piperidino)-pyridine,
4-(N-pyrrolidino)pyridine,
4-(N-morpholino)-pyridine,
N:N-bis(β-dimethylaminoethyl)-4-aminopyridine,
N-(β-dimethylaminoethyl)-N-ethyl-4-aminopyridine and
N-(β-N'-pyrrolidinoethyl)-N-methyl-4-aminopyridine.

There may also be used fully N-substituted 4-aminopyridines containing substituents in the 3 and/or 5 positions in the pyridine ring, for example short chain alkyl groups, or amino groups fully substituted by short chain alkyl groups containing 1 to 6 carbon atoms, by cyclic alkylene groups or as piperidino or morpholino groups. If desired, there may also be used compounds containing more than one fully N-substituted 4-aminopyridine residue, for example N:N'-bis(4-pyridyl)-N:N'-dimethylpropylene diamine,
N:N'-bis(4-pyridyl)-N:N'-dimethylethylene diamine,
N:N'-bis(4-pyridyl)-N:N'-dimethylhexamethylene diamine,
N:N'-bis(4-pyridyl)-N:N'-dimethyl-β:β'-diaminodiethyl ether,
N:N'-bis(4-pyridyl)-N:N'-dimethyl-1:4-diaminocyclohexane,
N-(4-pyridyl)-N'-methylpiperazine, and
N:N'-bis(4-pyridyl)-piperazine.

The fully N-substituted 4-aminopyridines specifically mentioned above are examples of types of compound which may be used in the process of the present invention. Thus other examples include 4-aminopyridines carrying various pairs of N-substituents selected from those N-substituents already mentioned.

Particularly advantageous results are obtained in the process of the present invention using N:N-dimethyl-4-aminopyridine and 4-(N-pyrrolidino)pyridine as catalysts.

The proportions of the fully N-substituted 4-aminopyridine to be used may be between 0.01% and 5%, and preferably between 0.05 and 2.5%, by weight of the hydroxyl-containing material. Larger or smaller amounts may be used if desired, but larger proportions may not lead to any additional advantage and smaller proportions may produce an effect inadequate for most technical requirements. The optimum proportions, however, will necessarily depend to a considerable extent upon the particular reaction components and conditions employed.

While the process of our invention may be used for the manufacture of any polyurethane products, whether rigid or flexible, cellular or homogeneous, and in the form of coatings, shaped articles and the like, it is especially advantageous for use in the manufacture of foamed polyurethane products by the simultaneous interaction of the hydroxyl-containing material, isocyanate and water, in particular where the hydroxyl-containing material is a polyether.

The starting materials to be used in the process of the present invention are those more fully described in the prior art relating to the manufacture of polyurethane products.

Thus suitable polyisocyanates include aliphatic diisocyanates such as hexamethylene diisocyanate, aromatic diisocyanates such as tolylene diisocyanates, diphenylmethane - 4:4' - diisocyanate, 3-methyldiphenylmethane-4:4'-diisocyanate, m- and p-phenylene diisocyanate, chlorophenylene-2:4'-diisocyanate and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenyl ether. Other polyisocyanates which may be used include polymers of tolyene-2:4-diisocyanate and polyisocyanate compositions comprising major proportions of diarylmethane diisocyanate and at least 5% by weight of polyisocyanate of functionality greater than two, made for example by phosgenating the corresponding diamines or the polyamine compositions obtained by condensing formaldehyde with aromatic amines. Mixtures of polyisocyanates may be used.

Any hydroxyl-containing material containing at least two hydroxyl groups per molecule may be used, in particular a polyester, polyether or polyesteramide.

The polyesters of polyesteramides are made essentially from dicarboxylic acids and glycols, and, as necessary, diamines or aminoalcohols. Suitable dicarboxylic acids include succinic, glutaric, adipic, suberic, azelaic and sebacic acids as well as aromatic acids such as phthalic, isophthalic and terephthalic acids. Mixtures of acids may be used. Examples of glycols are ethylene glycol, 1:2-propylene glycol, 1:3-butylene glycol, diethylene glycol, trimethylene glycol, tetramethylene glycol, pentamethlene glycol, hexamethylene glycol, decamethylene glycol and 2:2-dimethyltrimethylene glycol. Mixtures of glycols may be used and polyhydric alcohols, such as trimethylolpropane, pentaerythritol or glycerol, may be included in varying amounts according to the desired rigidity of the products. Examples of diamines and aminoalcohols include ethylene diamine, hexamethylene diamine, monoethanolamine, phenylene diamines and benzidine.

As examples of polyethers for use in the process of the present invention there may be mentioned hydroxyl-ended polymers and copolymers of cyclic ethers and especially of ethylene oxide, epichlorhydrin, 1:2-proylene oxide, 1:2-butylene oxide or other alkylene oxides, oxacyclobutane and substituted oxacyclobutanes, and tetrahydrofuran. Such polyethers may be linear polyethers, as are prepared, for example by the polymerisation of an alkylene oxide in the presence of a glycol initiator. Alternatively there may be used branched polyethers prepared for example by polymerising an alkylene oxide in the presence of a substance having more than two active hydrogen atoms, for example glycerol, pentaerythritol and ethylene diamine. Mixtures of linear and branched polyethers, or mixtures of polyesters and polyethers, may be used if desired.

Especially useful are polyethers that are polymers of 1:2-propylene and 1:2-butylene oxides.

It is preferred to use a hydroxyl-containing material wherein the hydroxyl groups are predominantly secondary hydroxyl groups, since thereby the most valuable and surprising technical results are obtained, namely the exceptional ease of satisfactory foam-formation. The process of the present invention is also applicable with advantage to hydroxyl-containing materials containing predominantly primary hydroxyl groups, however, since the amines specified are much more effective, less basic and less volatile than conventional tertiary amines, possess no odour at normal temperatures, and favour catalysis of the polyisocyanate/hydroxyl group reaction. Examples of compounds containing predominantly secondary hydroxyl groups are the polypropylene diols of molecular weight 500 to 2000 obtained by polymerising propylene oxide using a basic catalyst and either water or a simple glycol as an initiator; the polypropylene triols and polyols obtained in like manner using as initiators either simple triols such as glycerol or triethanolamine, or compounds of higher functionality such as ethylene diamine, mannitol or sucrose.

The interaction between the polyisocyanate, the hydroxyl-containing material, and any water employed may be carried out in a continuous or discontinuous manner using prior art methods for the manufacture of polyurethane products. The interaction may be modified if desired by the incorporation of other ingredients and known adjuvants, including other catalysts for the urethane-forming reaction either of a basic nature (for example, other tertiary amines such as dimethylcyclohexylamine and basic inorganic compounds such as potassium carbonate, potassium acetate and potassium naphthenate) or non-basic metal catalysts for example manganous and manganic acetylacetonates and dialkyl tin compounds, for example di-n-butyl tin dilaurate, non-ionic surface active agents, salts of sulphuric acid derivatives of high molecular weight organic compounds, silicone oils, foam-stabilising agents, for example ethyl cellulose, low molecular weight polyhydroxy compounds such as trimethylolpropane, pigments, colouring matters, plasticisers, for example dialkyl phthalates and fireproofing agents for example tri-($\beta$-chloroethyl)phosphate or antimony compounds, "blowing agents" such as volatile halogenoalkanes, for example fluorotrichloromethane, or mixtures thereof.

The catalysts employed in this invention, are in general, low melting solids which are easily soluble in either the water or the hydroxyl-containing material, and do not possess any malodorous or otherwise objectionable properties.

The invention is illustrated but not limited by the following examples, in which parts and percentages are by weight.

*Example 1*

50 parts of linear polypropylene glycol of molecular weight 1930, 17.5 parts of the 80:20 mixture of tolylene-2:4- and 2:6-diisocyanates, 0.50 part of 4-dimethylaminopyridine, 0.5 part of the condensation product of octyl phenol with 10 molecular proportions of ethylene oxide, 0.37 part of the sodium salt of sulphated methyl oleate and 1.2 parts of water are mixed together vigorously. The foaming and still fluid reaction mixture is poured into a mould and allowed to stand without application of external heat.

The product is a low density flexible foam of good physical properties.

Repetition of the procedure of the above example except that the 0.5 part of 4-dimethylaminopyridine is replaced by an equal amount of dimethylbenzylamine, dimethylcyclohexylamine, N-methylmorpholine or N-ethylpiperidine failed to yield foams. Unsuccessful results were also obtained when the quantities of these amines were increased. In each instance, a vigorous reaction occurred but the foam either failed to rise or collapsed.

Example 2

The procedure of Example 1 is repeated except that the 4-diemthylaminopyridine is replaced by an equal weight of 4-(N-piperidino)pyridine. The results obtained are similar to those described in Example 1.

Example 3

The procedure of Example 1 is repeated except that the 4-dimethylaminopyridine is replaced by an equal weight of 4-(N-morpholino)pyridine. The results obtained are similar to those described in Example 1.

Example 4

The procedure of Example 1 is repeated except that the 0.5 part of 4-dimethylaminopyridine is replaced by a mixture of 0.25 part of di-n-butyl tin dilaurate and 0.25 part of 4-dimethylaminopyridine. The results obtained are similar to those described in Example 1.

Example 5

The procedure of Example 4 is repeated except that the 4-dimethylaminopyridine is replaced by an equal weight of 4-(N-morpholino)pyridine. The results obtained are similar to those described in Example 1.

Example 6

A solution of 1.4 parts of 4-dimethylaminopyridine in 3 parts of water and 1.2 parts of an alkyl-silane-polyoxyalkylene co-polymer, is stirred gently into 100 parts of a linear polypropylene glycol of approximate molecular weight 2000 until a clear solution is obtained. 40 parts of an 80:20 mixture of tolylene-2:4-diisocyanate and tolylene-2:6-diisocyanate are added and the mixture vigorously stirred for 5 secs. and poured into a mould. A flexible foam of fine structure and density 0.04 g./cm.$^3$ is obtained.

Example 7

0.2 part of 4-dimethylaminopyridine and 0.5 part of dimethylbenzylamine are dissolved in 4.7 parts of a solution prepared from 50 parts of the reaction product of 1 mole of octylphenol with 8 moles of ethylene oxide, 34 parts of the sodium salt of sulphated methyl oleate and 151 parts of water. The resultant mixture is stirred into 100 parts of a linear polypropylene glycol of approximate molecular weight 2000, and a solution of 1 part of a methyl-phenyl polysiloxane containing 3 methyl groups to each phenyl group and having a viscosity of 120 centistokes at 25° C., in 42.5 parts of an 80:20 mixture of tolylene-2:4-diisocyanate and tolylene-2:6-diisocyanate is added with vigorous stirring. At the commencement of foaming, the mixture is poured into a mould. A flexible foam of density 0.030 g./cm.$^3$ and compression modulus 25.7 g./cm.$^2$ at 40% compression is obtained. On heating at 125° C. for 2 hours, the compression modulus is slightly raised to 27.3 g./cm.$^2$.

Example 8

The preparation described in Example 7 is repeated, replacing the 4-dimethylaminopyridine by 0.2 part of 4-piperidinopyridine, replacing the dimethylbenzylamine by 0.7 part of N-methylmorpholine and replacing the polypropylene glycol by 100 parts of a glycerol/propylene oxide reaction product of approximate molecular weight 3000. A flexible foam of density 0.033 g./cm.$^3$ with a compression modulus of 33.5 g./cm.$^2$ at 40% compression is obtained. The compression set after heating for 22 hours at 70° C. under 50% compression is 5.9%.

Example 9

The preparation described in Example 7 is repeated replacing the 4-dimethylaminopyridine by 0.2 part of 4-diethylaminopyridine, and replacing the polypropylene glycol by 100 parts of a glycerol/propylene oxide reaction product of approximate molecular weight 3000. A flexible foam of density 0.034 g./cm.$^3$ with a compression modulus of 20.3 g./cm.$^2$ at 40% compression is obtained.

Example 10

1 part of 4-dimethylaminopyridine and 0.2 part of 1-dimethylamino-3-ethoxypropane are dissolved in a solution of 1.5 parts of an alkyl-silane-polyoxyalkylene copolymer in 3.7 parts of water. This solution is stirred gently into a mixture of 71 parts of a linear polypropylene glycol of approximate molecular weight 2000, and 71 parts of a triol of approximate molecular weight 3000, obtained by the reaction of glycerol and propylene oxide. To this mixture are added 51.2 parts of an 80:20 mixture of tolylene-2:4-diisocyanate and tolylene-2:6-diisocyanate with rapid stirring. When foaming commences, the mixture is poured into a mould. A flexible foam of density 0.043 g./cm.$^3$ is obtained.

Example 11

The high catalytic activity of the catalysts forming the subject of this invention is illustrated by their use in the following lacquer formulation.

A mixture of cyclohexanone and methylethyl ketone (1:4 by volume) is prepared, and 124 parts of this mixture are stirred with 52 parts of a polyester (prepared from a mixture of glycerol, ethylene glycol, and adipic acid in the molar proportions of 1:3:3), until a clear solution is obtained. To this solution is added 20.8 parts of tolylene-2:4-diisocyanate in 20 parts of a cyclohexanone/methylethyl ketone mixture of the same composition and the resulting clear solution is allowed to stand for 21 hours. A solution of 0.04 part of each of the following tertiary amines, in 2 parts of the same cyclohexanone/methylethyl ketone mixture is added with stirring to 42 parts of a polyester/polyisocyanate)solvent mixture, prepared as described above. The time taken for the mixture to gel is recorded for purposes of comparison in the following table.

| Catalyst: | Gelling time (hours) at 22±2° C. |
|---|---|
| N:N-dimethylcyclohexylamine | 2.8 |
| N-methylmorpholine | 10.5 |
| Pyridine | 23 |
| 4-methylpyridine | 27 |
| 4-dimethylaminopyridine | 0.6 |
| 4-diethylaminopyridine | 0.8 |
| 4-N-pyrrolidinopyridine | 0.7 |

This lacquer system gels after approximately 200 hours in the absence of any catalyst.

The 4-N-pyrrolidinopyridine used in this example is prepared by the action of 12.4 parts of pyrrolidine hydrochloride on 10 parts of 4-phenoxypyridine at 210 to 220° C. for 3 hours. The product is obtained by rendering the mixture basic with caustic liquor followed by steam distillation and extraction of the distillate by petroleum ether (boiling point 40° to 60° C.). Recrystallisation of the 5.2 parts of white solid extract from petroleum ether (boiling point 30° to 40° C.) gives colourless flakes melting at 62 to 63° C., and containing 73.2% carbon, 8.2% hydrogen and 18.9% nitrogen ($C_9H_{12}N_2$ requires C=73.0; H=8.1; N=18.9%).

The picrate of this product melts at 149 to 150° C. and contains 47.7% carbon, 4.1% hydrogen and 18.7% nitrogen. ($C_{15}H_{15}N_5O_7$ requires C = 47.8; H = 4.0; N=18.6%.)

Example 12

100 parts of liquid polyester prepared from 1460 parts of diethylene glycol, 68 parts of pentaerythritol and 1898 parts of adipic acid and having a viscosity at 25° C. of 145 poises, a hydroxyl value of 65 mg. KOH/gm. and an acid value of 4.5 mg. KOH/gm. are mixed with 46.7 parts of a 65:35 mixture of tolylene-2:4-diisocyanate and tolylene-2:6-diisocyanate until a clear solution is obtained. A solution of 0.3 part of 4-dimethylaminopyridine, 1 part of the reaction product of one mole of octylphenol with 8 moles of ethylene oxide and 0.2 part of the reaction product of one mole of ricinoleic acid with 10 moles of ethylene oxide in 3.5 parts of water, is immediately added with vigorous stirring, and the mixture poured into a mould. A low density flexible foam with a fine structure is rapidly obtained.

*Example 13*

To 100 parts by weight of a polyester prepared from 0.66 part of pentaerythritol, 2.33 parts of butane-1:3-diol, 2.0 parts of adipic acid and 0.33 part of phthalic anhydride are added 4 parts of water, 2 parts of an alkyl-silane-polyoxy-alkylene co-polymer, 15 parts of β-trichloroethyl phosphate and 6 parts of a solution comprising 2 parts of 4-dimethylaminopyridine in 4 parts of water. The ingredients are blended thoroughly; 180 parts of a diphenylmethane diisocyanate composition are added and the whole is mixed for 1 minute with a high speed stirrer. The mixture is poured into a mould, where foaming takes place to give a rigid cellular structure having an extremely fine texture and a density of approximately 2.5 pounds per cubic foot.

The diphenylmethane diisocyanate composition used in this example is prepared by phosgenating a crude diaminodiphenylmethane, containing about 15% of polyamines (mainly triamines) obtained by condensing formaldehyde with aniline in the presence of hydrochloric acid.

*Example 14*

To 100 parts by weight of a branched propylene oxide polymer prepared by the reaction of propylene oxide with a trihydric alcohol and having an approximate molecular weight of 450 are added 1.5 parts of 4-dimethylaminopyridine and the mixture is heated at 80° C. for 1 hour. The resulting solution is cooled, 0.75 part of an alkyl-silane-polyoxy-alkylene co-polymer is added and 50 parts of monofluorotrichloromethane are blended with the mixture. 110 parts of the diphenylmethane diisocyanate composition used in Example 13 are added and the mixture is stirred rapidly by an efficient agitator for 30 seconds. The mixture is poured into a mould and foams to give a fine textured, rigid cellular structure having a density of 1.5 pounds per cubic foot.

What we claim is:

1. In a process for the manufacture of polyurethane materials by the interaction of an organic polyisocyanate and an isocyanate-reactive hydroxyl-containing material selected from the group consisting of polyesters and polyethers; the improvement which comprises carrying out the interaction in the presence of, as a catalyst, a fully N-substituted - 4 - amino-pyridine wherein N-substituents are selected from the group consisting of hydrocarbon radicals, heterocyclic radicals containing one hetero atom selected from the group consisting of nitrogen and oxygen, in a carbon chain, and hydrocarbon radicals substituted with alkylamino and dialkylamino groups.

2. A process as set forth in claim 1 in which said catalyst is N:N-dimethyl-4-aminopyridine.

3. A process as set forth in claim 1 in which said catalyst is 4(N-pyrrolidino) pyridine.

4. A process as set forth in claim 1 in which the amount of said catalyst used is between 0.01 and 5% by weight of the hydroxyl-containing material.

5. A process as set forth in claim 4 in which the amount of said catalyst used is between 0.05 and 2.5% by weight of the hydroxyl-containing material.

6. A process as set forth in claim 1 in which said organic polyisocyanate and said hydroxyl-containing material are interacted in the presence of water to form a foam.

7. A process as set forth in claim 6 in which the hydroxyl-containing material is a polyether.

8. A process as set forth in claim 7 in which said polyether is a polymer of 1:2-propylene oxide.

9. A process as set forth in claim 7 in which said polyether is a polymer of 1:2-butylene oxide.

10. A process as set forth in claim 1 in which the hydroxyl groups of said hydroxyl-containing material are predominantly secondary hydroxyl groups.

References Cited in the file of this patent

UNITED STATES PATENTS

| | | |
|---|---|---|
| 2,764,565 | Hoppe et al. | Sept. 25, 1956 |
| 2,770,241 | Winkler | Nov. 13, 1956 |
| 2,936,293 | Orth | May 10, 1960 |
| 2,957,832 | Gmitter et al. | Oct. 25, 1960 |